United States Patent
Dooley et al.

(10) Patent No.: US 7,005,092 B2
(45) Date of Patent: Feb. 28, 2006

(54) VEHICLE INTERIOR TRIM PANEL ASSEMBLY HAVING AN INTEGRATED SOFT-TOUCH ARM REST AND METHOD OF MANUFACTURING SAME

(75) Inventors: David James Dooley, Troy, MI (US); Mark Fero, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 371 days.

(21) Appl. No.: 10/439,524

(22) Filed: May 16, 2003

(65) Prior Publication Data

US 2004/0229013 A1    Nov. 18, 2004

(51) Int. Cl.
*B29C 44/06* (2006.01)

(52) U.S. Cl. .................. 264/46.5; 264/46.6; 264/46.8; 264/510; 264/511; 264/572

(58) Field of Classification Search .............. 264/46.5, 264/46.6, 46.8, 510, 572, 511
See application file for complete search history.

(56) References Cited

U.S. PATENT DOCUMENTS

| | | | |
|---|---|---|---|
| 4,455,340 A | 6/1984 | Okina | 428/215 |
| 5,073,318 A | 12/1991 | Rohrlach et al. | 264/46.5 |
| 5,208,269 A | 5/1993 | Brown | 521/125 |
| 5,397,409 A | 3/1995 | Kornylo | 156/79 |
| 5,580,501 A | 12/1996 | Gallagher et al. | 264/45.3 |
| 5,611,977 A | 3/1997 | Takei | 264/46.5 |
| 5,626,382 A | 5/1997 | Johnson et al. | 296/146.7 |
| 5,662,996 A | 9/1997 | Jourquin et al. | 428/318.8 |
| 5,744,231 A | 4/1998 | Igarashi et al. | 428/318.6 |
| 5,885,662 A | 3/1999 | Gardner, Jr. | 427/426 |
| 6,017,617 A | 1/2000 | Gardner, Jr. | 428/309.9 |
| 6,076,246 A * | 6/2000 | McCooey | 29/469.5 |
| 6,409,947 B1 | 6/2002 | Wandyez | 264/45.9 |
| 6,422,640 B1 | 7/2002 | Whitehead et al. | 296/146.7 |
| 6,663,734 B1 * | 12/2003 | Takei | 156/79 |
| 2001/0036971 A1 | 11/2001 | Usui et al. | 521/50 |
| 2002/0066972 A1 | 6/2002 | Fritsch | 264/46.4 |

FOREIGN PATENT DOCUMENTS

| | | |
|---|---|---|
| DE | 198 14 956 A1 | 10/1999 |
| EP | 0 370 767 A3 | 5/1990 |
| FR | 2847196 | 5/2004 |

* cited by examiner

*Primary Examiner*—Allan R. Kuhns
(74) *Attorney, Agent, or Firm*—Bill Panagos

(57) ABSTRACT

The present invention relates to a method of manufacturing an interior trim panel assembly having an integrated soft-touch area for improved aesthetic trim component quality. The method of manufacturing a trim panel assembly for the interior of a vehicle having an integrated soft-touch area of the present invention includes placing a molded trim panel including a coverstock having an exposed outer surface and a foam backing disposed opposite the outer surface and a rigid substrate having at least one aperture bonded to the coverstock into a mold cavity. The method of manufacture further includes separating the bonded coverstock and rigid polymer substrate in a localized area to define an internal chamber accessible by the aperture. The method of manufacture also includes injecting soft foam into the internal chamber through the aperture so as to be juxtaposed between the coverstock and the rigid polymer substrate in at least one predetermined location to define an integrated soft-touch area.

8 Claims, 2 Drawing Sheets

VEHICLE INTERIOR TRIM PANEL ASSEMBLY HAVING AN INTEGRATED SOFT-TOUCH ARM REST AND METHOD OF MANUFACTURING SAME

BACKGROUND OF THE INVENTION

1. Field of the Invention

The present invention relates, generally, to molded trim panels for automotive vehicle interiors. More specifically, the present invention relates to a vehicle interior trim panel assembly having an integrated soft-touch armrest and method of manufacturing same.

2. Description of the Related Art

Interior trim automobile components commonly have cushioned, "soft-touch" aesthetic features. In particular, automotive interior panels often have designated cushioned areas in the armrest or center console. These soft-touch areas may be manufactured separate from the interior trim panel, per se, and later assembled thereto or a soft-touch area may be integrated within an interior trim panel during its manufacture. In either event, a soft-touch aesthetic feature may be imparted by a flexible-foam or elastomeric pad of varying thickness surrounded by a coverstock material to provide available cushioned support to the occupants of a vehicle.

Generally, any number of materials may be used as coverstock such as cloth, a polymer skin or leather. Specifically, polymer coverstocks may include polyvinyl, polyvinyl chloride (PVC), thermoplastic olefin (TPO), or thermoplastic urethane (TPU). In vehicle interior trim applications, coverstocks include what is known as a "class-A side".

The class-A side is the "skin" or finished surface of the polymer coverstock and typically includes a pattern or texture, often simulating the grain of leather. The other side is the "rough" or bond surface of the coverstock that is usually attached to a rigid substrate. The rigid substrate serves as support for the interior trim panel. Generally, the other side of a polymer coverstock includes a thin layer of foam, typically made of polyurethane. Additionally, scrim or some type of a reinforcing agent, such as woven thread, may be applied to the exposed back of the polyurethane foam for structural support. The coverstock is then bonded to the rigid substrate and later assembled to a vehicle as an interior trim panel.

However, there are occasions where an additional amount of foam padding is preferred in certain designated areas, namely door panel armrests, center consoles, head rests and dashboards. As previously noted, door panel armrests and center consoles may be manufactured apart from the manufacture of their respective panels and later assembled. However, issues relative to proper fitting and maintaining a uniform color and texture between the coverstock on the soft-touch area and the rest of the trim panel assembly have been known to arise. Additionally, automotive manufactures generally prefer to reduce costs by reducing the steps in any given manufacture and/or assembly process. As a result, it is preferred to integrate a soft-touch area such as an armrest during manufacture of the entire interior trim panel, where possible.

Several different manufacturing processes are known to manufacture an interior trim panel having an integrated soft-touch aesthetic feature such as an armrest. By way of example, processes involving low pressure molding, structural reaction injection molding, and vacuum forming have all been employed to create an interior panel having an integrated soft-touch aesthetic feature such as an arm rest.

Low Pressure Molding ("LPM") is a method of injection molding where a thermoplastic material is injected into a mold cavity having a coverstock covering the class A side of the mold cavity. The thermoplastic material flows throughout the mold to conform to the shape of the mold and bond to the coverstock. The bonded materials are then removed from the mold, ready for any secondary finishing operations.

Structural Reaction Injection Molding ("SRIM") involves forming molded articles between two mold halves. An interior panel incorporating a cushioned armrest made by structural reaction injection molding includes a foam pad sandwiched between a coverstock and a rigid panel substrate. The foam is compressed due to the pressure of molding, e.g., up to about 50 psi, then expands outwardly against the cover as the pressure is released.

Vacuum forming is a process where the thermoplastic coverstock heated, then stretched onto a rigid substrate that has been covered with adhesive using a vacuum. The coverstock and rigid substrate then cure to the shape of the mold.

U.S. Pat. No. 6,183,038 issued on 6 Feb. 2001 to Hansen et al.; U.S. Pat. No. 5,611,977 issued on 18 Mar. 1997 to Takei; U.S. Pat. No. 5,073,318 issued on 17 Dec. 1991 to Rohrlach et al., and; U.S. Pat. No. 4,455,340 issued on 19 Jun. 1984 to Okina, further describe the afore-mentioned methods and variants thereof.

While vehicle interior trim panels having an integrated soft-touch area of the type known in the related art alleviate some of the problems associated with manufacturing this device, there remains a need to reduce costs by reducing the number of steps required to manufacture a vehicle interior trim panel incorporating a soft-touch area. In addition, there remains a need for a vehicle interior trim panel having an integrated soft-touch area. Finally, there remains a need in the art for a vehicle interior trim panel that provides a quality, desirable, class-A surface that is aesthetically pleasing.

SUMMARY OF THE INVENTION

The present invention overcomes the disadvantages in the related art in interior trim panels for vehicles and generally fulfills a need in the art for a method of manufacturing an interior trim panel assembly having an integrated soft-touch area for improved aesthetic and ergonomic trim component quality. To this end, the method of manufacturing a trim panel assembly for the interior of a vehicle having an integrated soft-touch area of the present invention includes placing a molded trim panel including a coverstock having an exposed outer surface and a foam backing disposed opposite the exposed outer surface and a rigid substrate having at least one aperture bonded to the coverstock into a mold cavity. The method further includes separating the bonded rigid polymer substrate and coverstock in a localized area to define an internal chamber accessible by the aperture. The method also includes injecting a soft foam having a predetermined pressure less than the maximum pressure of a mold into the internal chamber through the aperture so as to be juxtaposed between the coverstock and the rigid polymer substrate in at least one predetermined location to define an integrated soft-touch area.

Accordingly, one advantage of the present invention is that it provides an integrated soft-touch area within a vehicle interior trim panel to reduce the steps necessary to manufacture a vehicle interior trim panel having a soft-touch area.

Another advantage of the present invention is that it provides an integrated soft-touch area during manufacture of the trim panel that eliminates quality issues relating to positive alignment during later assembly of a soft-touch area within a trim panel.

Yet another advantage of the present invention is that it provides a monolithic coverstock to reduce the variation of color and texture between the trim panel and soft-touch area.

Other objects, features, and advantages of the present invention will be readily appreciated, as the same becomes better understood, after reading the subsequent description taken in conjunction with the accompanying drawings.

DETAILED DESCRIPTION OF THE INVENTION

Figure 1:
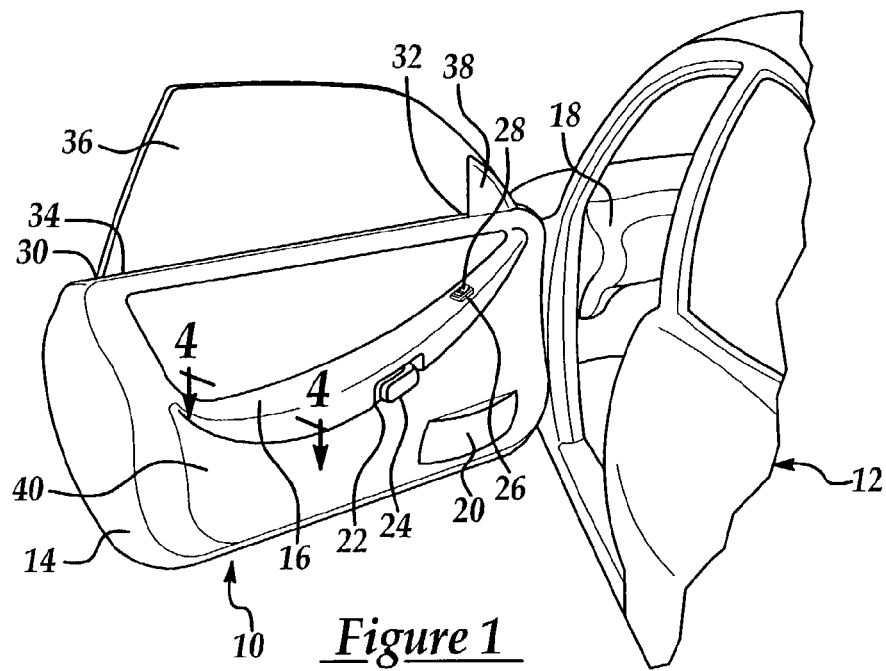
FIG. 1 is an environmental view of a vehicle including a vehicle interior trim panel assembly having an integrated soft-touch arm rest in accordance with an embodiment of the present invention.

The present invention overcomes the disadvantages in the related art in the manufacture of a vehicle interior trim panel assembly having an integrated soft-touch area that is generally indicated at 10 in the figures, where like numbers are used to designate like structure throughout the drawings. As shown in FIG. 1, the trim panel assembly 10 is employed within a vehicle, generally indicated at 12. Specifically, the trim panel assembly 10 is shown in connection with a driver's side door 14 and includes an integrated soft-touch area 16. As illustrated in FIG. 1, the soft-touch area 16 is an armrest. Accordingly, the integrated soft-touch area 16 may have tapered or squared edges. However, a gradually tapered peripheral edge is preferred to provide a smooth transition from the integrated soft-touch area 16 to the remaining areas of the trim panel assembly 10 and helps provide the no-read line appearance in the finished product. Those having ordinary skill in the art will appreciate that the trim panel assembly 10 may be employed anywhere within the interior of a vehicle 12 where an integrated soft-touch area 16 is desired. By way of example, the present invention may be a trim assembly for a dashboard 18, a center console, or a glove box.

Further, depending on the desired application of the present invention within a vehicle interior, the vehicle trim panel assembly 10 may include additional features or apertures for aesthetic or ergonomic reasons. By way of example, the vehicle trim panel assembly 10 shown in FIG. 1 includes a map pocket 20, a door handle aperture 22 for receiving a vehicle door handle 24, and a window control aperture 26 for receiving a window control 28. The vehicle trim panel assembly 10 may also be molded to any predetermined shape to accommodate adjacent components of the vehicle 12. By way of example, the vehicle trim panel assembly 10 shown in FIG. 1 includes predetermined contours 30 and 32 to cooperatively engage a window track 34 for receiving a window 36 and a side mirror panel 38 for covering the side mirror mounts (not shown) of a vehicle door 14.

With reference to FIGS. 1–4, the trim panel assembly 10 of the present invention includes a coverstock 40 having an exposed outer surface 42 and foam backing 44 disposed opposite the outer surface 42. The exposed outer surface 42 of the coverstock 40 may be constructed from a flexible closed-cell polymer skinning material suitable for application in a mold, such as polyvinyl, polyvinyl chloride (PVC), thermoplastic olefin (TPO), or thermoplastic urethane (TPU), which are conventionally used in automotive interiors. The exposed outer surface 42 of the coverstock 40 may range in thickness suitable for application in a vehicle interior to provide sufficient strength and flexibility without excessive rigidity.

The foam backing 44 may be manufactured from a variety of cross-linked polymer foam materials such as a solid elastomer, a chemically blown elastomer of closed-cell or micro-cellular structure. By way of example, the foam backing 44 may be polyethylene, polypropylene, polyurethane, and polystyrene foams. Preferably, the foam backing 44 is made of a closed cell foam impermeable to gas and liquid. The preferred closed-cell nature of foam backing 44 prevents the seepage during later molding applications, which can result in loss of softness and uneven degrees of softness in finished trim panel assembly 10. Optionally, a mesh or reinforcing material (not shown) such as fiberglass or nylon may be applied to the foam backing 44 so that the reinforcing material becomes embedded in the finished trim panel assembly 10. The foam backing 44 of the coverstock 40 may range in thickness from 0.02 to 0.20 inch. However, those having ordinary skill in the art will appreciate that the thickness of the foam backing 44 may include any thickness suitable for application in a vehicle interior trim panel to provide a degree of softness throughout the trim panel assembly 10.

Figure 2:
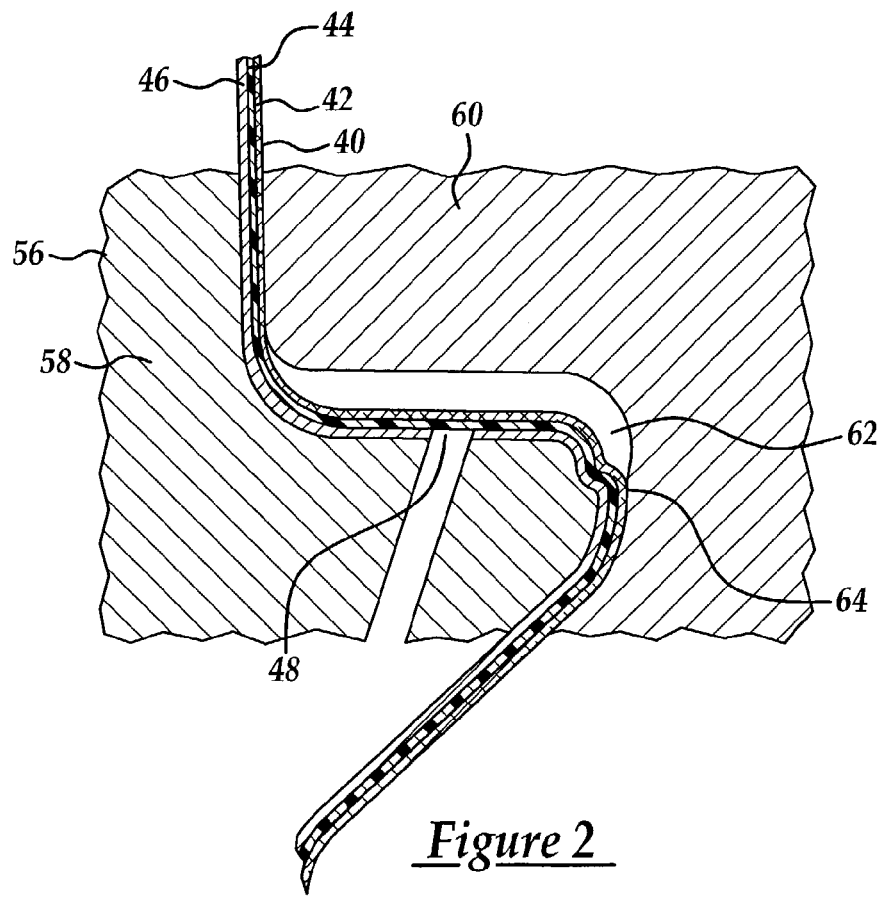
FIG. 2 is a cross sectional view of a vehicle interior trim panel assembly in a mold prior to receiving an integrated soft touch arm rest in accordance with an embodiment of the present invention.
Figure 3:
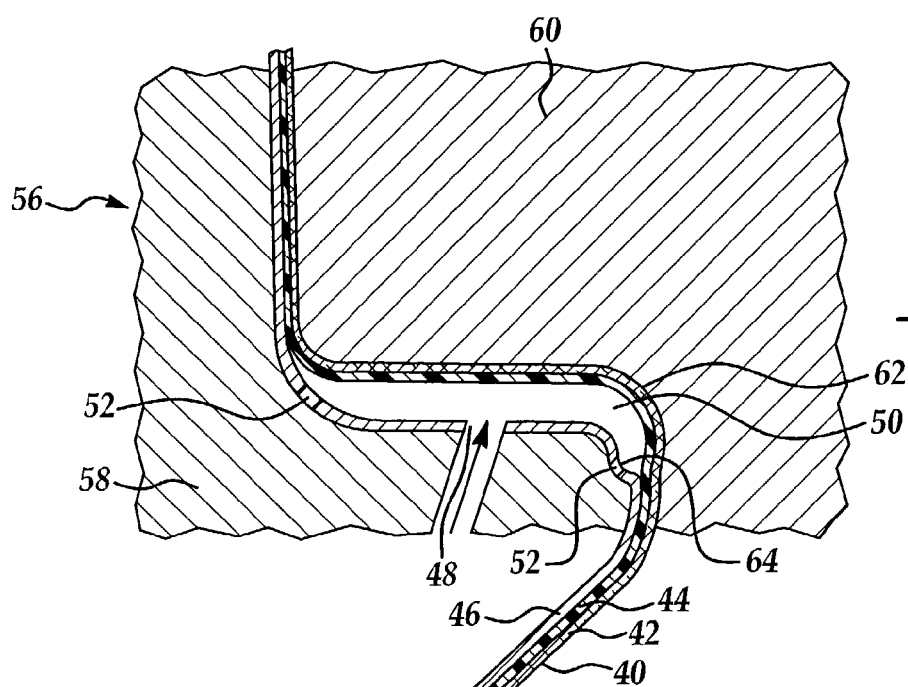
FIG. 3 is a cross sectional view of a vehicle interior trim panel assembly in a mold defining the internal chamber in accordance with an embodiment of the present invention.
Figure 4:
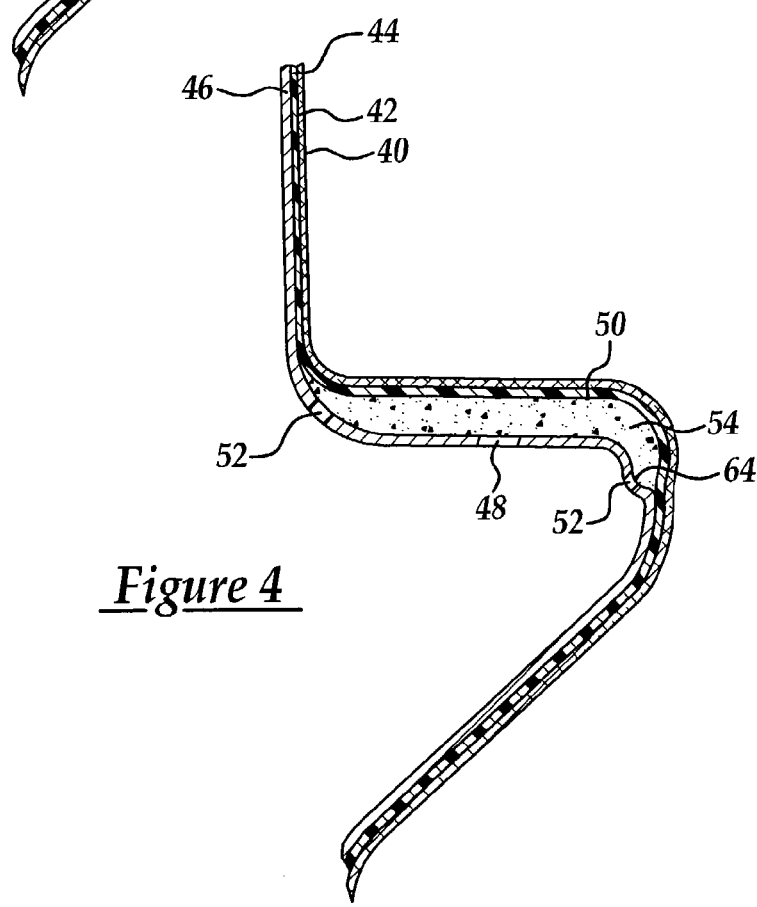
FIG. 4 is a cross sectional view of a vehicle interior trim panel assembly including an integrated soft-touch armrest in accordance with an embodiment of the present invention.

Referring to FIGS. 2–4, the trim panel assembly 10 of the present invention further includes a rigid polymer substrate 46 having at least one aperture 48. As will be discussed in greater detail below, the rigid polymer substrate 46 is bonded to the foam backing 44 juxtaposed between the rigid polymer substrate 46 and exposed outer surface 42 of the coverstock 40. The rigid polymer substrate 46 may be manufactured from several polymer or composite materials commonly known in the related art and suitable for use in vehicle trim applications that form a rigid substrate after curing. By way of example, such materials may include nylon or polypropylene. As shown in FIGS. 3 and 4 the foam backing 44 of the coverstock 40 and the rigid polymer substrate 46 cooperate to define an internal chamber 50 accessible by the aperture 48. The internal chamber 50 is defined by a separation between the rigid polymer substrate 46 and the coverstock 40 through a delaminating process, which will be discussed in greater detail below.

Referring specifically to FIGS. 3 and 4, the aperture 48 of the rigid polymer substrate 46 is a blind hole providing access to the internal chamber 50. The aperture 48 may be formed while molding the rigid polymer substrate 46 or may be drilled into the rigid polymer substrate 46 following formation and curing of same. In either event, the aperture 48 has a predetermined diameter and is placed at a predetermined location relative to the area of the trim panel assembly 10 corresponding to the integrated soft-touch area 16. The rigid polymer substrate 46 may additionally include one or more ventilation ports 52 adapted to release pressure in the internal chamber 50 as a result of the manufacturing process, as will be discussed in greater detail below. Those having ordinary skill in the art will appreciate that while the present invention may include ventilation ports 52, the aperture 48 may provide sufficient ventilation for the release of pressure in the internal chamber 50 depending on the manufacturing process.

Referring to FIG. 4, the trim panel assembly 10 of the present invention further includes a soft foam 54 received in the internal chamber 50 through the aperture 48. The soft foam 54 is juxtaposed between the coverstock 40 and the rigid polymer substrate 46 in at least one predetermined location to impart an integrated soft-touch area 16. The soft foam 54 is an expandable foam having a predetermined density and resiliency to impart a soft feel, yet remain resistant to pressures applied thereto. Depending on the intended application, the indentation load deflection ("ILD") of the soft foam 54 may vary. Generally speaking, the IDL may range from 10 to 20 lbs. However, those having ordinary skill in the art will appreciate that the IDL and thickness of the soft foam 54 will be determined based on the desired application.

Referring to FIGS. 2 and 3, a method, according to the present invention, of manufacturing a trim panel assembly 10 for the interior of a vehicle 12 having an integrated soft-touch area 16 is disclosed using a mold 56 having first and second mold haves 58, 60 defining a mold cavity 62. The method of manufacturing the present invention includes placing a molded trim panel having a coverstock 40 bonded to a rigid substrate 46 having at least one aperture 48 into a mold cavity 62.

However, one method of manufacturing the trim panel of the present invention involves applying the coverstock 40 to a surface of the mold 56 used to later form the rigid polymer substrate 46 so that rigid polymer substrate 46 is bonded to coverstock 40 at the same time that the rigid polymer substrate 46 is molded and formed, thereby eliminating the need for an adhesive. In this preferred process, the exposed outer surface 42 of the coverstock 40 engages the class-A side of a mold cavity 62. The mold cavity 62 defines a predetermined form. A rigid-forming polymer material is applied over the foam backing 44 to form a rigid polymer substrate 46 and to bond it to the coverstock 40. Those having ordinary skill in the art will appreciate that the rigid-forming polymer material has a melting point less than the foam backing 44, or at a minimum, the rigid-forming polymer material bears a temperature less than the melting point of the foam backing 44 when they are engaged. The nature of such a bond is different from one formed by using an adhesive as this bond is inherently cohesive, and is superior to an adhesive bond.

Following the application of the rigid-forming polymer material to the foam backing 44 of the coverstock 40, the two components are left to cure corresponding to a predetermined form. In the present case, as shown in FIG. 1, the predetermined form is a vehicle interior driver's side door trim panel assembly. As previously noted, the rigid polymer substrate 46 includes an aperture 48. The aperture 48 may be formed during the molding of the rigid polymer substrate 46 or may be generated after the rigid polymer substrate 46 has cured. In either event, the aperture 48 is a blind hole. Further, those having ordinary skill in the art will appreciate that the rigid polymer substrate 46 may also include at least one blind ventilation port 52 formed or generated in kind to the aperture 48. Depending on the rate at which the soft foam 54 is injected, a blind ventilation port 52 may be included in the rigid polymer substrate 46 to expel gases from the internal cavity 50. Otherwise, the aperture 48 will suffice is accomplishing the same end.

As previously noted, the rigid polymer substrate 46 and the coverstock 40 cooperate to define an internal chamber 50 accessible by the aperture 48. Within a mold 56, a predetermined area of the bonded rigid polymer substrate 46 and coverstock 40 is isolated to define the perimeter of the internal chamber 50. The isolating of the perimeter will prevent delaminating beyond the predetermined area that may cause an irregular soft-touch area 16. Once the perimeter of the internal chamber 50 is isolated, the bonded rigid polymer substrate 46 and said coverstock 40 within the perimeter are delaminated by the introduction of pressurized air through the aperture 48 into the internal chamber 50. Accordingly, the pressurized air is introduced at a predetermined pressure less than the maximum clamp pressure of a mold 56. Additionally, those having ordinary skill in the art will appreciate that the mold half 60 engaging the coverstock 40 may include a vacuum to apply vacuum pressure onto an area of the coverstock 40 corresponding the internal chamber 50 prior to injecting the soft foam 54 into the internal chamber 50. The application of vacuum pressure will maintain the integrity of the internal chamber 50, preventing any likelihood of the coverstock 40 once again bonding rigid polymer substrate 46 within the predetermined area.

At this point the present invention may receive the soft foam 54. Soft foam 54 is injected into the internal chamber 50 through the aperture 48 so as to be juxtaposed between the coverstock 40 and the rigid polymer substrate 46 in at least one predetermined location to define an integrated soft-touch area 16. Those having ordinary skill in the art will appreciate that the injection of the soft foam 54 through the aperture 48 into the internal chamber 50 occurs at a predetermined pressure less than the maximum clamp pressure of a mold 56. The soft foam 54 has a predetermined rate of expansion as well as a predetermined cured density. Preferably, the soft foam 54 should have a low viscosity and easy flow characteristics, which can be obtained by adjusting conditions such as the amount of blowing agent, amount of catalyst(s), and monomer content. During injection of the expandable foam 54, the molding conditions and the characteristics (i.e. expansion rate and cured density) of the soft foam 54 are adjusted in a manner to effectively eliminate a visible outline of the localized soft-touch area 16 when cured.

Following the injection of the soft foam 54 into the internal chamber 50, the soft foam 54 is left to cure. This may occur within the mold 56 or the vehicle trim assembly 10 may be removed from the mold 56 at this time and left to cure. Preferably, the soft foam 54 is cured while the vehicle trim assembly 10 remains within a mold 56 to form the integrated soft-touch area 16. In this manner, the curing soft foam 54 will not creep beyond the isolated perimeter of the internal chamber 50.

It is also possible to intentionally distort the skin-side mold surface in the soft touch area in a manner effective to prevent bulging of the soft foam 54 after injection. This can be done by, for example, providing a sliding, adjustable mold component that pushes in on the soft foam 54 and coverstock 40 in the area of the internal chamber 50, compressing the soft foam 54 and forming an indentation 64 during molding. Once the soft foam 54 has cured, the vehicle trim assembly 10 is removed from the mold 56 and the soft foam 54 may desire to bulge out, but only to its normal position, not to the extent that a read-line is formed. The intentional distortion of the soft foam 54 and coverstock 40 compensates for the rebound that may occur after removal from the mold 56. Finally, the vehicle interior trim panel assembly 10 having an integrated soft-touch area 16 is removed from the mold 56 and installed onto a corresponding predetermined area of a vehicle interior.

The present invention provides an integrated soft-touch area 16 within a vehicle interior trim panel assembly manufactured within a single mold. Accordingly the present invention reduces the steps necessary to manufacture a vehicle interior trim panel assembly 10 having an integrated soft-touch area 16. Further, the present invention 10 includes a soft-touch area 16 integrated within a vehicle interior trim assembly during the manufacture of same. This integration eliminates quality issues relating to positive alignment of a soft-touch area 16 relative to a vehicle interior trim panel assembly during later assembly. Still further, the present invention 10 facilitates the use of a monolithic coverstock 40 in connection with a vehicle interior trim panel assembly 10 having an integrated soft-touch area 16. This structure alleviates manufacture and assembly problems associated with color and texture variations between the coverstock 40 applied to a trim panel assembly and the coverstock 40 applied to a soft-touch area 16.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A method of manufacturing a trim panel assembly for the interior of a vehicle having an integrated soft-touch area comprising the steps of:
    placing a molded trim panel including a coverstock having an exposed outer surface and a foam backing disposed opposite said exposed outer surface and a rigid substrate having at least one aperture bonded to said coverstock into a mold cavity;
    separating said bonded rigid substrate and said coverstock in at least one predetermined location through the introduction of a pressurized gas to define at least one internal chamber accessible by said aperture;
    injecting a soft foam having a predetermined pressure less than the maximum clamp pressure of a mold into said internal chamber through said aperture so as to be juxtaposed between said coverstock and said rigid substrate in said predetermined location to define at least one integrated soft-touch area.

2. The method as set forth in claim 1 further including the step of:
    engaging said exposed outer surface with a surface of a mold cavity to define a class A surface on said exposed outer surface.

3. The method as set forth in claim 1 further including the step of:
    applying a rigid-forming polymer material having a melting point less than said foam backing to said foam backing to form said rigid substrate and bond said coverstock to said rigid polymer substrate.

4. The method as set forth in claim 1 further including the step of:
    curing said rigid substrate bonded to said coverstock in a mold cavity to correspond to a predetermined form.

5. The method as set forth in claim 1 further including the steps of:
    isolating said predetermined location of said bonded rigid substrate and said coverstock so as to define a perimeter of said internal chamber; and
    delaminating said coverstock bonded to said rigid substrate within said perimeter by the introduction of pressurized air through said aperture and into said internal chamber where said pressurized air has a predetermined pressure less than the maximum clamp pressure of a mold.

6. The method as set forth in claim 1 further including the step of:
    applying vacuum pressure to said coverstock corresponding to said internal chamber prior to injecting said expandable foam into said internal chamber to maintain said internal chamber.

7. The method as set forth in claim 1 further including the step of:
    generating at least one blind ventilation port into said rigid substrate to expel pressurized gas during the injection of said soft foam into said internal chamber through said aperture.

8. The method as set forth in claim 1 further including the steps of:
    curing said soft foam injected into said internal chamber to form an integrated soft-touch area;
    removing said vehicle interior trim panel assembly having an integrated soft-touch area, and;
    installing said vehicle interior trim panel assembly having an integrated soft-touch area onto a corresponding predetermined area of a vehicle interior.

* * * * *